United States Patent [19]

Villain

[11] 4,397,304

[45] Aug. 9, 1983

[54] SOLAR SENSOR EQUIPPED WITH SOLAR ENERGY ABSORBING MEMBER AND PANEL HAVING SUCH SENSORS

[75] Inventor: Jacques Villain, Paris, France

[73] Assignee: Compagnie des Lampes, France

[21] Appl. No.: 340,020

[22] Filed: Jan. 18, 1982

Related U.S. Application Data

[63] Continuation of Ser. No. 103,082, Dec. 12, 1979, abandoned.

[30] Foreign Application Priority Data

Dec. 28, 1978 [FR] France ................. 78 36676

[51] Int. Cl.³ ............................................. F24J 3/02
[52] U.S. Cl. .................................... 126/443; 126/442; 126/449; 126/448; 138/113; 138/114; 138/140
[58] Field of Search .............. 126/443, 446, 449, 442, 126/448; 138/112, 113, 114, 140; 165/69, 81, 154

[56] References Cited

U.S. PATENT DOCUMENTS

| 1,068,650 | 7/1913 | Harrison | 126/443 X |
|---|---|---|---|
| 2,076,210 | 4/1937 | Stadtfeld | 138/113 |
| 2,468,902 | 5/1949 | Villiger | 138/114 |
| 3,000,495 | 9/1961 | Downing | 138/114 X |
| 3,417,785 | 12/1968 | Andrews | 138/108 |
| 3,915,147 | 10/1975 | Rineer | 126/443 X |
| 3,983,861 | 10/1976 | Beauchaine | 126/446 X |
| 4,069,811 | 1/1978 | Tabor | 126/443 |
| 4,133,298 | 1/1979 | Hayama | 126/446 X |
| 4,180,055 | 12/1979 | Hudnall | 126/446 |

Primary Examiner—Larry Jones

[57] ABSTRACT

The invention relates to a sensor equipped with a member which selectively absorbs solar energy.

This member is constituted by two sheets of a rigid material serving as a support for a layer of material which is sensitive to solar radiation, the two sheets being joined together over their entire length and folded in such a way that the member has a lozenge-shaped cross-section, which can be applied in four contact zones against a tubular wall and can remain in intimate and permanent contact with the latter, no matter what the temperature variations undergone by the assembly.

10 Claims, 4 Drawing Figures

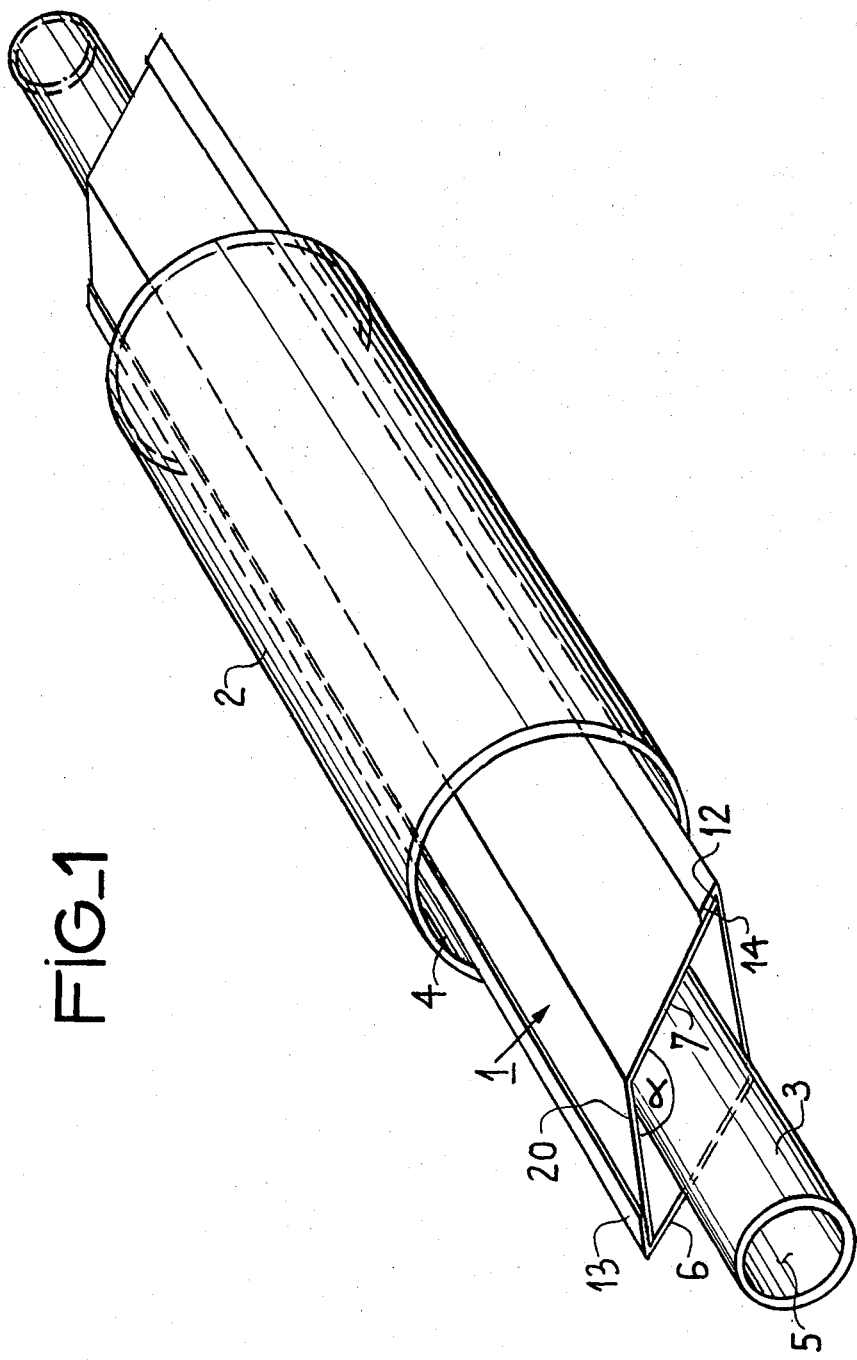

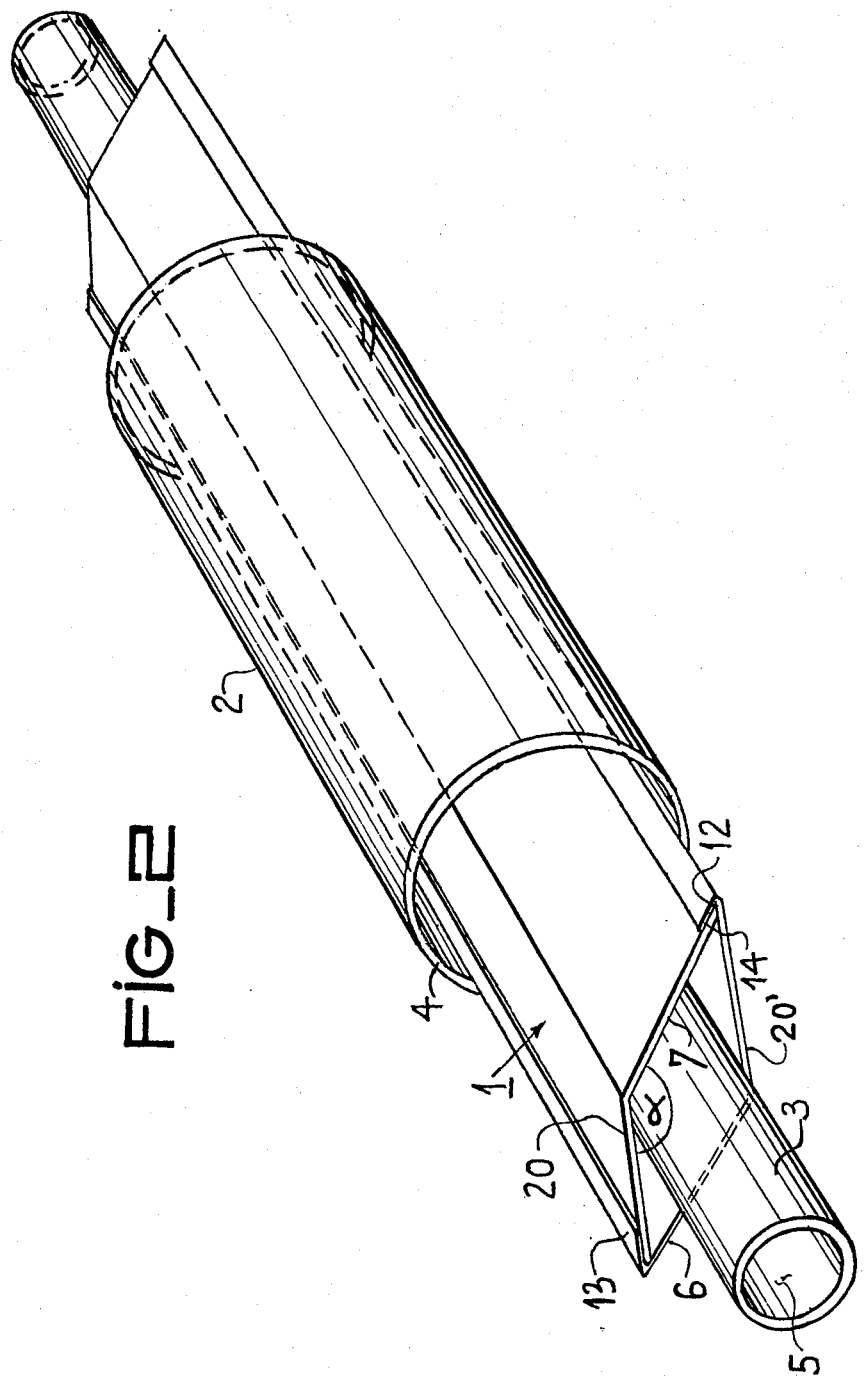

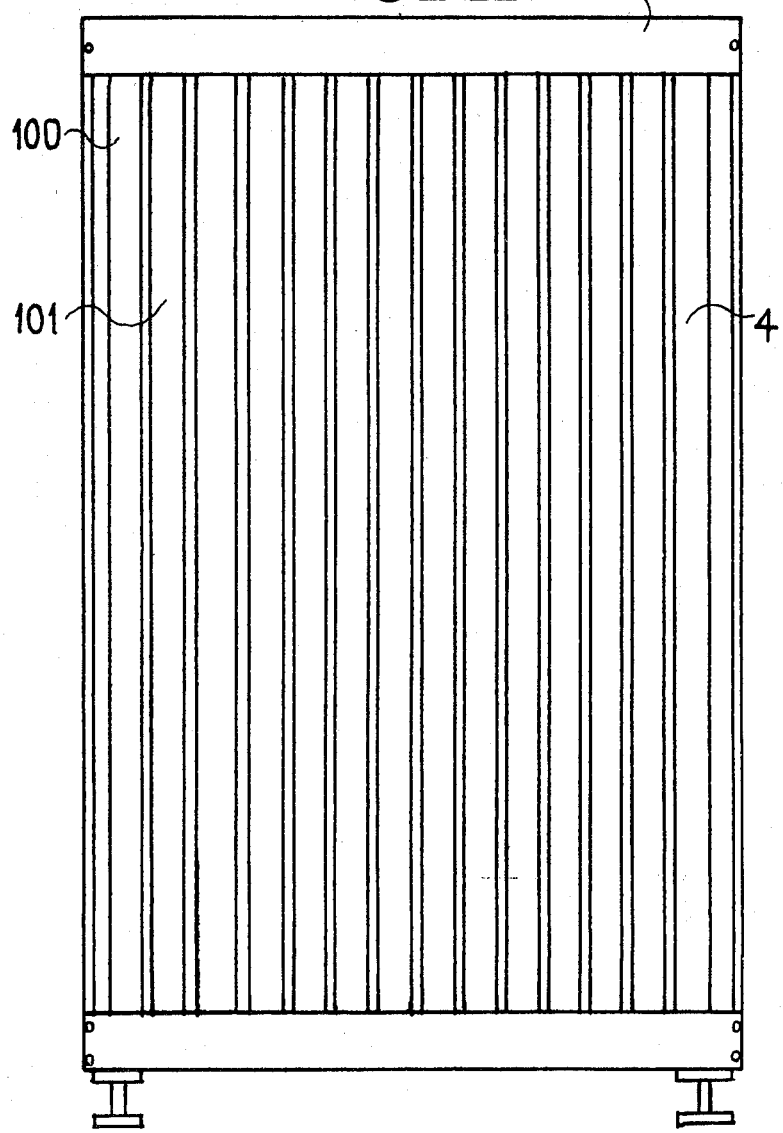
FIG_3
FIG_4

SOLAR SENSOR EQUIPPED WITH SOLAR ENERGY ABSORBING MEMBER AND PANEL HAVING SUCH SENSORS

This is a continuation, of application Ser. No. 103,082, filed Dec. 12, 1979, now abandoned.

The present invention relates to solar sensors equipped with a solar energy absorbing member and to solar panels having such sensors.

The construction of tubular solar sensors is known for example from U.S. Pat. No. 4,133,298. They are essentially constituted by a first and a second transparent glass envelope, defining between them an enclosure which is placed under vacuum. The inside of the first envelope serves to receive a heat exchanger. The face of the first envelope located in the vacuum enclosure is covered with a metal sheet, whose portion which is exposed to solar radiation is coated with a material which is preferably selectively sensitive to said radiation. The efficiency of the device is dependent on the quality of the material.

The present invention relates to solar sensors using an absorbing member having a high absorptive power in the wavelength range corresponding to sunlight and a low emissive power in the wavelength range corresponding to infrared, whereby this applies no matter what the shape or type of the heat exchanger associated therewith.

The invention more specifically relates to a sensor using a member which selectively absorbs solar energy and which is to be introduced between two tubular glass envelopes, one being external and transparent and the other internal and defining between them an enclosure which is placed under vacuum, the inner envelope serving as a wall for a recess, which itself serves to receive a heat exchanger, whereby said member comprises two sheets of metal, each being folded in accordance with an angle α such that after assembly of said two sheets, the absorbing member has a lozenge-shaped cross-section surrounding the inner envelope and resiliently in contact with the latter over four contact zones in such a way as to ensure a good heat transfer efficiency between the absorber and the exchanger.

The invention will be described in greater detail hereinafter relative to non-limitative embodiments and the attached drawings, wherein:

FIG. 1 and 2 are embodiments of an absorbing member according to the invention.

FIGS. 3 and 4 respectively a front view and a plan view of a solar panel.

As is shown in FIG. 1 the absorbing member of the solar sensor according to the invention is placed between two envelopes 2 and 3 defining an enclosure 4 in which a vacuum is formed. The inner envelope 3 constitutes the wall of a recess 5 for receiving a heat exchanger (not shown in the drawing). This absorbing member is constituted by an assembly of two sheets 6 and 7 made from a relatively rigid and elastic material having a spring action and which is a good heat conductor and preferably of metal. The modulus of elasticity of this material is selected in such a way that it is not significantly modified by the heat treatments which it must frequently undergo. At least one of these sheets is made, according to a first constructional variant, of a material which, besides the elasticity characteristics indicated hereinafter is treated so that it is selectively sensitive to solar radiation, or according to a second variant serves as a support for a layer of material (e.g. pure copper) having said quality. One of the sheets, that is not exposed to solar radiation, can advantageously comprise a material which, when polished, has a high reflection factor with respect to infrared radiation, in such a way that the outer face of said sheet having a low emission coefficient in infrared, only radiates very slightly when heated to a high temperature. This treatment and/or this layer 20, in the embodiment described by means of FIG. 1, is realised over at least the complete part of the member exposed to solar radiation. Moreover, said two sheets are joined together on either side over their entire length. To this end the first sheet 6 has two turned down portions 12 and 13, which hold fast the second sheet 7. The two sheets are joined together by spot welding 14 or any other connecting process. Finally these sheets are bent in accordance with two angles α in such a way that the thus formed member has a lozenge-shaped cross-section, surrounding the first envelope and is brought into intimate contact therewith in four contact zones by a constant pressure which is a function of the angle α and of the modulus of elasticity of the material chosen. This arrangement and this choice of material makes it possible to obtain a permanent contact pressure such that a threshold, which is itself a function of the mechanical characteristics of the material used, is not exceeded as a result of heating and/or abnormal folding or bending. The copper layer is deposited either by an electrolytic process or by plating or by any other process. Its thickness is between 2 and 100 microns, but is preferably between 2 and 20 microns. For reasons of clarity the components described hereinbefore have only partly been shown.

On studying the meteorological readings relative to certain sites, it is found that a large part of the solar radiation consists of diffuse flows, due to the cloudiness of the atmosphere at these sites. The solar flux is not directional and as a result of its diffusion through the cloud layers it can be collected by the front and rear faces of tubular sensors arranged in a panel not having an end plate.

To increase the absorbant surface of solar sensors of the type described above an embodiment illustrated in FIG. 2 is made use of.

As shown in the FIG. 2, a second layer 20', for example of the same type as layer 20 is deposited upon the near face of the element. The other means of the solar energy absorber members are the same as for the embodiment described in FIG. 1.

The fitting up of sensors equipped with members which selectively absorb solar energy, as described hereinbefore, makes it possible to obviate the use of reflectors arranged on the outer surface of the sensors. Moreover, the useful parts of these sensors are protected from the action of the external environment. These two features make it possible to combine such sensors into an overhead panel. As shown in FIG. 3 and 4, the sensors can then collect the solar energy on their two faces. A plurality of solar sensor 100, 101 . . . n equipped with an absorbing member 4 are arranged over head in a body 110.

The use of an absorbing member according to the invention in the manufacture of solar sensors, themselves grouped to form solar panels, ensures a maximum heat transfer efficiency to the right of the exchanger, independently of the exchanger type and shape.

The invention is not limited to the embodiments described and represented hereinbefore and various modifications can be made thereto without passing beyond the scope of the invention.

What is claimed is:

1. A solar sensor comprising an outer tubular transparent glass envelope and an inner tubular glass envelope defining between them an enclosure which is placed under vacuum, the inner envelope serving as a wall of a recess which itself receives a heat exchanger, and a solar energy absorbing member introduced between the outer and inner envelopes, said absorbing member comprising two sheets made from a metal, each of which is folded in accordance with an angle $\alpha$, such that after assembly of said two sheets the absorbing member has a lozenge-shaped cross-section surrounding the inner envelope and resiliently engaging with the latter in four contact zones.

2. A solar sensor according to claim 1, wherein the first and second sheets are made from steel.

3. A solar sensor according to claim 2, wherein the first sheet is coated with a thin layer of a material which is sensitive to solar radiation.

4. A solar sensor according to claim 3, wherein said sensitive material is plated copper.

5. A solar sensor according to claim 3, wherein said sensitive material is electrolytically deposited copper.

6. A solar sensor according to claim 2, wherein the first and second sheets are coated with a thin layer of a material which is sensitive to solar radiation.

7. A solar sensor according to claim 6, wherein said sensitive material is plated copper.

8. A solar sensor according to claim 6, wherein said sensitive material is electrolytically deposited copper.

9. A solar sensor according to claim 2, wherein one of said sheets that is not exposed to solar radiation on its outer face is polished on its outer face.

10. A solar panel comprising a plurality of solar sensors arranged overhead, each of said solar sensors comprising an outer tubular transparent glass envelope and an inner tubular glass envelope defining between them an enclosure which is placed under vacuum, the inner envelope serving as a wall of a recess which itself receives a heat exchanger, and a solar energy absorbing member introduced between the outer and inner envelopes, said member comprising two sheets made from a good heat conducting material, each of which is folded in accordance with an angle $\alpha$, such that after assembly of said two sheets the absorbing member has a lozenge-shaped cross-section surrounding the inner envelope and resiliently engaging with the latter in four contact zones.

* * * * *